FIG. 1
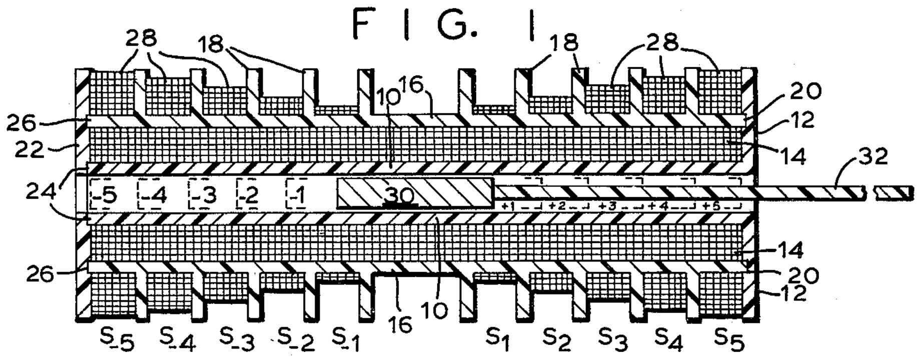
FIG. 2
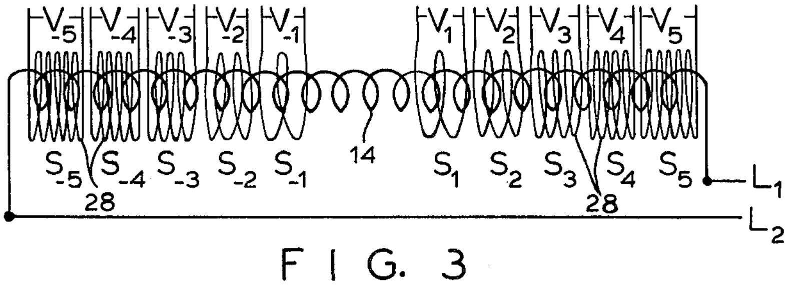
FIG. 3
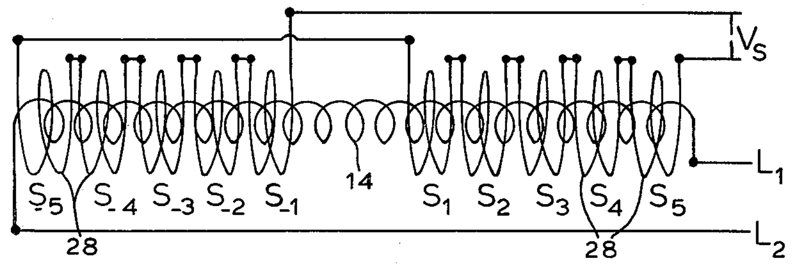
| ARMATURE POSITION | SECONDARY SECTIONS SEC. 5 | SEC. 4 | SEC. 3 | SEC. 2 | SEC. 1 |
|---|---|---|---|---|---|
| +5 | $V_{55}$ | $V_{45}$ | $V_{35}$ | $V_{25}$ | $V_{15}$ |
| +4 | $V_{54}$ | $V_{44}$ | $V_{34}$ | $V_{24}$ | $V_{14}$ |
| +3 | $V_{53}$ | $V_{43}$ | $V_{33}$ | $V_{23}$ | $V_{13}$ |
| +2 | $V_{52}$ | $V_{42}$ | $V_{32}$ | $V_{22}$ | $V_{12}$ |
| +1 | $V_{51}$ | $V_{41}$ | $V_{31}$ | $V_{21}$ | $V_{11}$ |
| | (NULL POSITION) | | | | |
| -1 | $V_{-51}$ | $V_{-41}$ | $V_{-31}$ | $V_{-21}$ | $V_{-11}$ |
| -2 | $V_{-52}$ | $V_{-42}$ | $V_{-32}$ | $V_{-22}$ | $V_{-12}$ |
| -3 | $V_{-53}$ | $V_{-43}$ | $V_{-33}$ | $V_{-23}$ | $V_{-13}$ |
| -4 | $V_{-54}$ | $V_{-44}$ | $V_{-34}$ | $V_{-24}$ | $V_{-14}$ |
| -5 | $V_{-55}$ | $V_{-45}$ | $V_{-35}$ | $V_{-25}$ | $V_{-15}$ |
FIG. 4
INVENTOR
ROBERT W. PERSONS Jr.
BY
BLAIR, SPENCER & BUCKLES
ATTORNEYS.

June 23, 1964 R. W. PERSONS, JR 3,138,772

SYMMETRICAL DIFFERENTIAL TRANSFORMERS

Filed May 28, 1959

2 Sheets-Sheet 2

FIG. 5

$$V_{S5}=(V_{55}+V_{45}+V_{35}+V_{25}+V_{15})-(V_{-55}+V_{-45}+V_{-35}+V_{-25}+V_{-15})$$

$$V_{S5}=(V_{55}-V_{-55})+(V_{45}-V_{-45})+(V_{35}-V_{-35})+(V_{25}-V_{-25})+(V_{15}-V_{-15})$$

$$V_{S4}=(V_{54}-V_{-54})+(V_{44}-V_{-44})+(V_{34}-V_{-34})+(V_{24}-V_{-24})+(V_{14}-V_{-14})$$

$$V_{S3}=(V_{53}-V_{-53})+(V_{43}-V_{-43})+(V_{33}-V_{-33})+(V_{23}-V_{-23})+(V_{13}-V_{-13})$$

$$V_{S2}=(V_{52}-V_{-52})+(V_{42}-V_{-42})+(V_{32}-V_{-32})+(V_{22}-V_{-22})+(V_{12}-V_{-12})$$

$$V_{S1}=(V_{51}-V_{-51})+(V_{41}-V_{-41})+(V_{31}-V_{-31})+(V_{21}-V_{-21})+(V_{11}-V_{-11})$$

FIG. 6

$$5V_{S1}=A(V_{55}-V_{-55})+B(V_{45}-V_{-45})+C(V_{35}-V_{-35})+D(V_{25}-V_{-25})+E(V_{15}-V_{-15})$$

$$4V_{S1}=A(V_{54}-V_{-54})+B(V_{44}-V_{-44})+C(V_{34}-V_{-34})+D(V_{24}-V_{-24})+E(V_{14}-V_{-14})$$

$$3V_{S1}=A(V_{53}-V_{-53})+B(V_{43}-V_{-43})+C(V_{33}-V_{-33})+D(V_{23}-V_{-23})+E(V_{14}-V_{-14})$$

$$2V_{S1}=A(V_{52}-V_{-52})+B(V_{42}-V_{-42})+C(V_{32}-V_{-32})+D(V_{22}-V_{-22})+E(V_{12}-V_{-12})$$

$$1V_{S1}=A(V_{51}-V_{-51})+B(V_{41}-V_{-41})+C(V_{31}-V_{-31})+D(V_{21}-V_{-21})+E(V_{11}-V_{-11})$$

FIG. 7

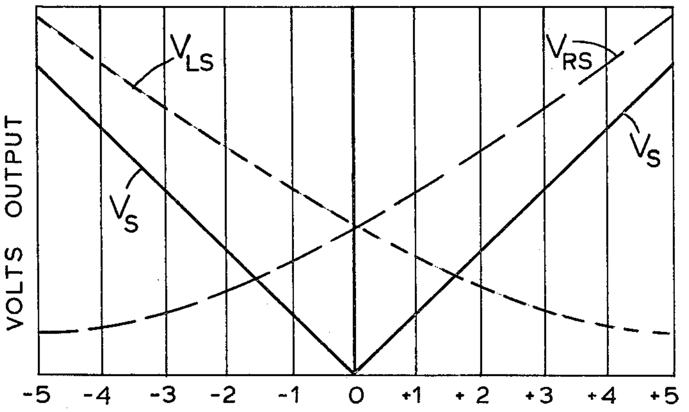

INVENTOR
ROBERT W. PERSONS Jr.

BY
BLAIR, SPENCER & BUCKLES
ATTORNEYS 3,138,772
SYMMETRICAL DIFFERENTIAL TRANSFORMERS

Robert W. Persons, Jr., Port Washington, N.Y., assignor to Automatic Timing and Controls, Inc., King of Prussia, Pa., a corporation of Pennsylvania
Filed May 28, 1959, Ser. No. 816,522
4 Claims. (Cl. 336—136)

This invention relates to differential transformers and a method of constructing same in which the transformers have a varying turns ratio between their primary and secondary windings, over their entire length. The varying turns ratio provides a predetermined output which is a particular function of the position of the moveable core of the transformer. More particularly a long stroke differential transformer having tapered windings for providing a linear output as a function of core position is described. In this transformer the turns ratio of secondary to primary increases towards the outer ends of the transformer.

In recent years differential transformers having cylindrically wound coils and an axially moveable magnetic core have proved to be one of the most useful forms of electromechanical transducer. Such differential transformers having four symmetric bifilar wound coils are described in the U.S. patent of W. D. Macgeorge 2,568,587 issued September 18, 1951. In the transformers described in that patent, two of the axially spaced bifilar wound coils are connected in series to form the primary winding of the transformer. The other two axially spaced bifilar wound coils are connected, most usefully, in series bucking relationship to provide a secondary output which is a linear function of core position and is of zero magnitude when the core is centrally located within the transformer. The voltages produced in the secondary when so connected are of opposite phase when the core is at opposite sides of this null position; and this phase sensitivity increases the usefulness of the signal produced.

Transformers made according to the Macgeorge patent form a class of extremely linear A.C. electromechanical transducers which are stable over a rather wide temperature range; have no friction and very little reactive force associated with movement of the core; which are capable of being produced on a mass basis; and which when so produced are identical enough in transducing characteristics as to be interchangeable. These transducers being analog devices have essentially infinite resolution, that is, every movement of the core no matter how small produces a change in the output of the device. They also have a relatively high signal to noise ratio, the null voltage being very small in comparison to the maximum linear signal produceable and this high signal to noise ratio allows the infinite resolution characteristics of the device to be fully exploited.

However, transformers of this nature have one inherent limitation and that is their very high sensitivity does not allow the devices to be used for long stroke motions without some kind of motion reduction device. Because the linearity of these devices is generally limited to a few hundredths of an inch, if it is desired to produce an electrical signal which corresponds to the movement of an arm on a machine which, for example, has a stroke of six inches, it is necessary through gears or levers or pulleys to change that six inch motion to a proportional motion of the order of a few hundredths of an inch so that the short stroke motion can be used to drive the differential transformer. As is well known to those skilled in the art, such gear, lever or pulley systems are inherently given to introducing errors in their motion transformations and, through friction and mass, introduce reactive forces into the system.

It has therefore become highly desirable to design differential transformers for converting motions of long stroke directly into a linearly proportional electrical signal. Such transformers would find broad application in industry for controlling long movements in various kinds of machines, and in measuring liquid levels and other long stroke motions. Such a transformer should have the same kind of output characteristics over a long linear stroke as the four coil bifilar wound transformers described in the Macgeorge Patent 2,568,587 (previously described), so that they may be employed in null balance servo systems using the Macgeorge short stroke transformer as the receiver or servo transformer of the system. In this manner, given the required long stroke differential transformer, long stroke motion may be converted to short stroke motion by purely electrical means introducing practically no reactive or frictional forces to act against the motion being measured.

It is also highly desirable in some applications that differential transformers be produced having secondary outputs which are not linear or straight line functions of core position; but are predetermined mathematical functions or curved functions of core position. For example, where a differential transformer is used to convert rotary motion to an electrical signal, it is necessary to construct somewhere in the system a special cam, or its electrical equivalent, which will eliminate the so-called sine error. That is, if the differential transformer core is moved linearly along the tangent to the motion (which is most convenient); there will be a very small error between the linear motion and the angular motion, which error increases as the angle moved increases and is proportional to the sine of the total angular motion. Another illustration of a situation in which a differential transformer having a particular mathematical function of core position as an output is desirable, is the situation where, in a true feed back control system, the correction upon the controlling variable which must be introduced is not a linear function of the output variable being measured by the differential transformer. In such a system it is necessary when using linear transducers to introduce a cam, or its electrical equivalent, into the system so that the correction will be the proper function of the variable being measured by movement of the differential transformer core. Such a cam could be eliminated by using a differential transformer having an output which is the proper function of core position rather than a linear function of core position.

Now it will be understood that the prior art differential transformers do not meet the above noted needs for long stroke linear differential transformers and for differential transformers having outputs which are predetermined mathematical functions of core position. The reason for this being primarily, the uncontrolled flux leakage at the ends of the transformer, the high sensitivity of such transformers and the extremely short stroke linearity and uncontrollable non-linearity heretofore characterizing the operation of these devices.

Previous long stroke differential transformers have been constructed by elongating the bifilar wound coils of the transformers of the previously described Macgeorge patent and by constructing compound cores for such transformers which will, to some extent, compensate for the non-linear flux leakage at the ends of the transformers. Such a long stroke differential transformer is described in Patent No. 2,568,588, issued September 18, 1951, of W. D. Macgeorge. However, it is rather difficult to construct a differential transformer of given length as described in the said Macgeorge patent, since the core must be constructed on a trial and error basis until the required linearity is achieved. Also the length of the transformer is limited since if the coils become very long, in order to prevent flux leakage, an extremely large number of turns must be wound and the impedance of such devices becomes so large as to make them practically unusable in a null balance system with the low impedance transformers described in the Macgeorge Patent 2,568,587.

The solution to the above problems provided by the present invention consists of varying the turns ratio along the windings of the differential transformer. That is, at any given point along the length of the transformer, the turns ratio along an incremental distance at that point, of the primary to the secondary coils will be different than at other points along the transformer. In the present invention a mathematical method is employed which, when applied to differential transformers constructed according to the teachings of the invention, provides a point-by-point approximation to any function as the output of the differential transformer.

It is therefore an object of this invention to provide a long stroke transducer. Another object of the invention is to provide such a long stroke transducer which has little reaction force. A further object of the invention is to provide such a transducer in the form of a differential transformer.

Still another object of the invention is to provide differential transformers having the above long stroke and short stroke characteristics and an output which is a predetermined function of core position. Yet another object of the invention is to provide differential transformers of the above character having linear outputs over a long stroke. A further object of the invention is to construct differential transformers of the above character having a single simple core.

Yet a further object of the invention is to construct differential transformers of the above character in which the normally increasing flux leakage towards the ends of the transformer is compensated for in a predetermined manner. And a still further object of the invention is to provide a method of making transformers of the above character.

Other objects of the invention will in part be obvious and will in part appear hereinafter.

The invention accordingly comprises the several steps and the relation of one or more of such steps with respect to each of the others, and the apparatus comprising the features of construction, combinations of elements, and arrangements of parts which will be exemplified in the method and constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a sectional side view of a differential transformer constructed according to the present invention, having a linear output;

FIGURE 2 is a wiring diagram of the differential transformer shown in FIGURE 1, showing connections made to temporary coils wound on the transformer for providing design information;

FIGURE 3 is a wiring diagram of the differential transformer of FIGURE 1 showing the connection of its secondary coils for operation as a phase sensitive linear transducer;

FIGURE 4 is a diagram, in tabular form, of the voltages produced in the temporary coils at different positions of the transformer core;

FIGURE 5 is a tabulation of the equations defining the net voltages produced in the differential transformer of FIGURE 1 at different core positions;

FIGURE 6 is a tabulation of simultaneous linear algebraic equations, derived from the equations tabulated in FIGURE 5; the coefficients of the equations being indicative of the number of turns on each coil of the transformer of FIGURE 1 necessary to produce a linear output; and, FIGURE 7 is a graph of the non-linear voltage outputs of the right and left halves of the secondary of the differential transformer of FIGURE 1 as functions of core position, and the linear output of the total secondary resultant of its being connected as shown in FIGURE 3.

Similar reference characters refer to similar elements throughout the several views of the drawings.

In general the differential transformers constructed according to the teachings of the present invention comprise a long bobbin which is somewhat longer than the length of the stroke desired; a relatively short simply constructed moveable core; a long primary wound substantially along the entire length of the bobbin; and a plurality of secondary coils forming two symmetrical secondaries about the null position. When used as a phase sensitive differential transformer the primary is excited as a long series unit and the coils of each of the symmetrical secondaries are connected together in series aiding and the two resultant secondaries are connected in series bucking. The number of turns on each of the secondary coils is varied according to the method hereinbelow described, and in the case when the transformer is designed to produce a long stroke linear output, the number of turns on each secondary coil increases towards the outer ends of the transformer.

Generally speaking, the method of the present invention consists of constructing a differential transformer having a geometry equivalent to the final transformer, that is, having a given long primary, a core and a given number of coils of given length for secondaries. Onto this transformer there are wound a plurality of search coils as temporary secondaries of the transformer. The primary, secondaries and core are then assembled into a test transformer. The primary is excited with a voltage of constant frequency and magnitude and the voltages produced in each of the test coils are measured at a series of equally spaced core positions which are symmetric around the null position and are equal in number to the number of secondary coils. These voltage values at various core positions are then inserted into the equations shown in FIGURE 6, and the equations are solved for the capital letter coefficient, preferably by using an electronic computer. The coefficients correspond to each coil of the secondary; and a transformer is then wound having a primary identical to the test transformer; an identical core; and a secondary, each coil of which consists of a number of turns equal to the number of turns on the respective search or test coil times its coefficient. The final transformer is connected as shown in FIGURE 6 for conventional use as a phase sensitive differential transformer.

When solving for the coefficients which determine the number of turns on each of the secondary coils, the values of the desired function of core position are inserted into the equations shown in FIGURE 6, to the left of the equals signs. Thus, as will be obvious to anyone skilled in the art, any predetermined function of core position may be designed for. And the more closely the function is to be approximated, or the greater the non-linearity, or derivative of the function, the larger the number of individual secondary coils necessary to approximate the function.

Referring to FIGURE 1, in particular, a differential transformer according to the present invention comprises an inner bobbin 10 of generally cylindrical shape having a flange 12 of large diameter at one of its ends. A primary coil 14 of generally cylindrical construction is wound upon the bobbin 10. An outer bobbin 16 of generally cylindrical shape having a series of equally spaced flanges 18 along its exterior is adapted to enclose the primary 14 and to fit at one end into an annular groove 20 located in the flange 12 of the inner bobbin 10. At the other end of the inner and outer bobbins there is located a disc shaped end cap 22 which has annular grooves 24 and 26 located in its inner face which interfit with the inner bobbin 10 and the outer bobbin 16, respectively, to form a rigid transformer structure. The inner and outer bobbins 10 and 16, the respectively integral flanges 12 and 18, and the end cap 22 are all formed of non-conducting, non-magnetic material, and preferably are formed of one of the various solid plastic materials.

Between the flanges 18, which with the flange 12 and the end cap 22 form a series of equally spaced annular sections, are wound a symmetrical series of secondary coils 28. These secondary coils 28 which for convenience are labeled $S_1$, $S_2$, $S_3$, $S_4$ and $S_5$ on the right side of the transformer and $S_{-1}$, $S_{-2}$, $S_{-3}$, $S_{-4}$ and $S_{-5}$ on the left side of the transformer are identically spaced and have identical numbers of turns on the corresponding sections on opposite sides of the transformer, i.e., they are symmetrical in respect to an imaginary plane perpendicular to and bisecting the axis of the transformer. In the case of a linear transformer, as illustrated in FIGURE 1, the number of turns on each secondary coil 28 increases towards the ends of the transformer.

Within the inner bobbin 10 there is located a core 30 of magnetically permeable material of generally cylindrical shape. The core 30 is slightly smaller in diameter than the inner diameter of the inner bobbin 10 so that it may be moved freely along the axis of the transformer. A core arm 32 is attached to the core 30 in any convenient manner and facilitates moving the core 30 from outside the transformer. The core is constructed of a material whose magnetic permeability is easily duplicated from heat to heat, such as 49 nickel alloy (Driver Harris No. 152 alloy). The core arm 32 is constructed of some non-magnetic material and preferably is also dielectric. Thus it may be made of glass or plastic material. The core 30 is one-third the length of the transformer stroke and one-quarter the length of the primary winding 14; but these dimensions are not critical. Thus in the transformer illustrated the stroke is 75% of the effective length of the transformer.

Referring now to FIGURE 3, the transformer is shown schematically as it is ordinarily connected. The primary 14 is excited with a voltage of constant magnitude and frequency illustrated by the lines L1, L2. The secondaries 28 on each side transformer are connected together in series aiding and the two sides of the transformer are then connected together in series bucking providing a voltage output $V_S$.

Referring now to the diagram in FIGURE 7 of the voltage output versus core position it can be seen that for the long stroke linear transformer illustrated in FIGURE 1 and connected as shown in FIGURE 3, the straight line output $V_S$ illustrated in FIGURE 7 results.

Differential transformers of this nature are constructed according to the following method. From experience it is known that a primary winding of a differential transformer, constructed according to the present method, should bear the ratio in length to the desired stroke of approximately 1.33 to 1.00. Therefore in order to construct a transformer having the desired characteristics a primary is constructed of the desired length having as small a diameter as possible since this increases linearity, simplifies the secondary characteristics, and increases the heat dissipation and thus the stability of the resulting transformer. A plurality of temporary secondaries or search coils are then wound onto the transformer in the positions where the permanent secondaries will be located, as shown schematically in FIGURE 2 of the drawings. These search coils are symmetrical in location and in number of turns in respect to an imaginary plane perpendicular to and bisecting the axis of the transformer. In the particular case of the long stroke linear differential transformer shown in FIGURE 1, search coils of 20, 40 60, 80 and 100 turns would be wound onto the secondary sections $S_1$, $S_2$, $S_3$, $S_4$ and $S_5$, respectively and onto the corresponding left hand secondary sections. The core 30 or armature of the transformer is then inserted into the test transformer and the primary as illustrated in FIGURE 2 is energized with a voltage of constant magnitude and frequency equal to that which will be used to energize the primary of the completed transformer.

The core 30 (FIGURE 1) is then moved to a series of equally spaced positions on either side of its central or null position equal in number to the number of secondary coils. These positions are shown in FIGURE 1 by dotted lines. The voltages from each of the temporary search coils $S_1$, $S_2$, etc., are measured when the core is in each of the aforementioned test positions.

The results of these measurements are illustrated in tabular form in FIGURE 4. The extreme left hand column of that tabulation shows the ten armature positions and the top row shows the five secondary sections on one side of the transformer. Each voltage is tabulated in the form $V_{s,p}$, where $s$ is the number corresponding to the secondary section and $p$ the number corresponding to the position, so that $V_{43}$, for example, is the voltage of the fourth secondary section $S_4$ when the core is at the +3 position. When the subscript is negative, either a negative position or a voltage taken from a coil on the left side of the transformer is indicated. That is, $V_{-35}$, for example, is the voltage from the coil $S_{-3}$ at the +5 position or it is the voltage from the coil $S_3$ at the −5 position. It will be obvious to those skilled in the art, that the measurements tabulated in FIGURE 4, since the coils on the two sides of the transformer are identical, may be made either by measuring the voltages from the coils on one-half of the transformer while the core is moved to all ten positions, or they may be made by measuring the voltages from all ten of the search secondaries while the core is moved to the five positions on one side of the transformer.

If the transformer wound with the temporary search coils were the final transformer organization and if it were connected as the final transformer will be, as illustrated in FIGURE 3, the voltage $V_S$ produced across all the secondaries would be equal to the sum of the voltages produced in the secondaries on one side of the transformer minus the sum of all the voltages produced on the other side of the transformer. For example, the equation of the top row of FIGURE 5 shows the method of calculating the voltage $V_{S5}$ of the total secondary when the core is in the +5 position. This may be written in more convenient form as shown in the second row in FIGURE 5 and the equations giving the total voltage across the secondary, $V_S$, in the other four positions of the transformer may be written as the last four rows of equations shown in FIGURE 5. Since the transformer is symmetrical around the center or null core position, the last five rows of FIGURE 5 fully define at the test core positions, the transformer output, which is symmetrical about the null position.

Now if the measurements tabulated in FIGURE 4 are substituted into the equations of FIGURE 5, the total secondary voltages $V_{Sp}$, where $p$ equals 1, 2, 3, 4 and 5, will indicate that the transformer wound with the search coils will not produce a linear output. In order to calculate what number of turns are necessary on each secondary coil in order to produce a linear output the equations of FIGURE 5 are rewritten as the equations of FIGURE 6. As can be seen in the equations of FIGURE 6, the voltages produced in each pair of secondary coils at the test core positions are multiplied by the respective common factors indicated by the capital letters A, B, C, D, and E. And the output at each of the five equally spaced core positions of the test transformer are defined to be whole number multiples of the output $V_{S1}$, the voltage produced in the secondary when it is connected as shown in FIGURE 3 and when the core is in the first core position. When the output for the five core positions is as indicated, the transformer will produce a linear output, by definition.

Next, the set of linear algebraic equations of FIGURE 6 may be solved for the capital letter coefficients according to standard algebraic methods; and may most conveniently be solved by a modern electronic computer. The solution of the equations of FIGURE 6 then gives us the values of the capital letter coefficients. As will be obvious to anyone skilled in the art, since the voltages produced in each pair of coils are proportional to the number of turns (which we know from the standard transformer equation), then the coefficients multiplied by the number of test turns on each search coil gives the number of turns that, that pair of secondaries must have, to provide a transformer having a linear output.

Transformers may then be wound having identical primaries to the test transformer, identical cores and geometry, and secondaries having the number of turns determined by the above method located in the same geometric positions as the test or search coils. These transformers will then have a linear output. The results of such a construction can be seen in FIGURE 7 wherein the voltage output $V_{LS}$ and $V_{RS}$ of the left and right hand series connected secondaries of the final transformer are plotted. These outputs are, as can be seen in FIGURE 7, non-linear functions of core position. However, as also can be seen in FIGURE 7, the difference between the two outputs $V_S$ (which, as can be seen in FIGURE 3, is derived by connecting the left and right hand secondaries in series bucking), is a phase sensitive linear function of core position. Thus a differential transformer has been constructed having a point to point approximation to a linear output. As will be obvious to those skilled in the art, the linearity of the transformer output will increase as the number of secondary coils is increased. It is therefore possible, according to this method, to construct a linear differential transformer having any desired length.

It will also be obvious to those skilled in the art that since the desired linear output of the final transformer was inserted into the equation of FIGURE 6 merely as the point by point approximation to the left of the equals signs, that the method of the present invention may be used to construct a differential transformer having an output which is any desired function of core position. That is, it is merely necessary to insert the desired output at the equally spaced core positions of the test transformer into the equations of FIGURE 6 at the left of the equals signs in order to calculate the correct number of turns on each secondary coil necessary to produce that output at those core positions. Of course, if the desired output is a sharply curved function of core position, that is if it has a large first derivative, a large number of secondary coils will be necessary to accurately approximate the function. Thus the set of simultaneous linear equations of FIGURE 6 may be generalized in the form:

$$V_{s,p}=\Sigma_s N_s(V_{s,p}),\ s=1, 2, 3, \ldots, n;\ p=1, 2, 3, \ldots, n;$$

where $V_{S,p}$ indicates the desired secondary output $V_S$ at the $p$th core positions, $V_{s,p}$ indicates the voltage produced in the $s$th secondary coil at the $p$th core position, and $N_s$ indicates the coefficient corresponding to the $s$th secondary coil.

As will also be obvious to those skilled in the art, the method of the present invention of making a differential transformer having an output which is a desired function of core position by a point to point approximation may be generalized to a continuous approximation. That is, the number of secondary coils may be increased without limit to a continuously changing turns ratio between the primary and secondary windings of the transformer. To construct such a transformer it is merely necessary to wind a test transformer having a known continuously varying turns ratio, measure the continuous output of such a test transformer as a function of core position and, according to the methods of the calculus analogous to the algebraic method set out above, a new function may be derived which is the continuously varying turns ratio necessary to produce the desired output function.

It will thus be seen that the objects set forth above, among those made apparent from the preceding description, are efficiently obtained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A long stroke differential transformer comprising, in combination, an elongated substantially cylindrical primary coil, a substantially shorter elongated substantially cylindrical core of magnetically permeable material contained within said primary coil, means for axially moving said core within said primary coil, means for exciting said primary coil with an alternating electrical potential of substantially constant magnitude and frequency, and a plurality of substantially cylindrical secondary coils axially disposed along and concentrically wound around said primary coil; said primary coil, secondary coils, and said core when located centrally within said primary coil being symmetrical with respect to a plane perpendicular to and bisecting the axis of said primary coil, each of said secondary coils extending an equal distance along said primary coil, the secondary coils on each side of said plane of symmetry being connected together in series aiding and the two connected coils then formed being connected in series bucking, the number of turns of each of said secondary coils increasing outwardly from the center toward the opposite ends of said transformer and being chosen to provide an electrical potential output from said series connected secondary coils which is a linear function of core position.

2. The differential transformer of claim 1 in which the number of turns on each of said secondary coils is a whole number multiple of the number of turns on the smallest of said coils.

3. The differential transformer of claim 2 in which said whole numbers include every whole number up to and including that which is equal to the number of said secondary coils.

4. A differential transformer comprising, in combination, a long cylindrical winding, an axially movable core of magnetically permeable material contained within said winding, and only two shorter windings in bucking relation to one another and concentric with said long winding, said two windings having respective predetermined numbers of turns thereon which increases outwardly from the center toward opposite ends of said transformer to provide, when said long winding is excited, a predetermined output from said shorter windings as a function of core position, said long and shorter windings of said transformer being symmetrical with respect to a plane perpendicular to and bisecting the axis of said long winding.

References Cited in the file of this patent

UNITED STATES PATENTS

| | | |
|---|---|---|
| 1,671,106 | Fisher | May 29, 1928 |
| 2,424,766 | Miner | July 29, 1947 |
| 2,568,588 | Macgeorge | Sept. 18, 1951 |
| 2,911,632 | Levine | Nov. 3, 1959 |
| 3,017,589 | Chass | Jan. 16, 1962 |
| 3,017,590 | Chass | Jan. 16, 1962 |